United States Patent [19]

Johnson et al.

[11] 4,058,817
[45] Nov. 15, 1977

[54] PHOTOGRAPHIC EXPOSURE APPARATUS FOR PROVIDING SMALL APERTURES

[75] Inventors: Bruce K. Johnson, Andover; Irving Laskin, Sharon; George D. Whiteside, Lexington, all of Mass.

[73] Assignee: Polaroid Corporation, Cambridge, Mass.

[21] Appl. No.: 646,286

[22] Filed: Jan. 2, 1976

[51] Int. Cl.² .............................................. G03B 7/14
[52] U.S. Cl. ........................................ 354/26; 354/59; 354/230
[58] Field of Search .................................. 354/26–30, 354/42, 49, 59, 230, 270

[56] References Cited

U.S. PATENT DOCUMENTS

| | | | |
|---|---|---|---|
| 3,006,265 | 10/1961 | La Rue, Jr. | 354/270 |
| 3,023,683 | 3/1962 | Kobayashi | 354/49 |
| 3,842,423 | 10/1974 | Craig et al. | 354/59 |
| 3,896,458 | 7/1975 | Johnson et al. | 354/230 |
| 3,952,312 | 4/1976 | Douglas | 354/230 |

Primary Examiner—L. T. Hix
Assistant Examiner—William B. Perkey
Attorney, Agent, or Firm—David R. Thornton

[57] ABSTRACT

An exposure control system for photographic apparatus having a shutter-diaphragm mechanism for regulating the exposure aperture and the exposure interval under both ambient and flash illumination conditions having a blade arrangement which when driven in an opening direction provides enlarging aperture values in a tracking relation defining both a taking aperture and a photocell aperture. The latter being specially configured to initially provide relatively small aperture values necessary for proper flash exposure at near subject distances includes a pair of blade openings wherein the leading portion of one opening is a segment of short length as measured along the axis of diaphragm movement so that, when it is in overlapping arrangement to the leading edge of the other opening, very small aperture values result.

19 Claims, 12 Drawing Figures

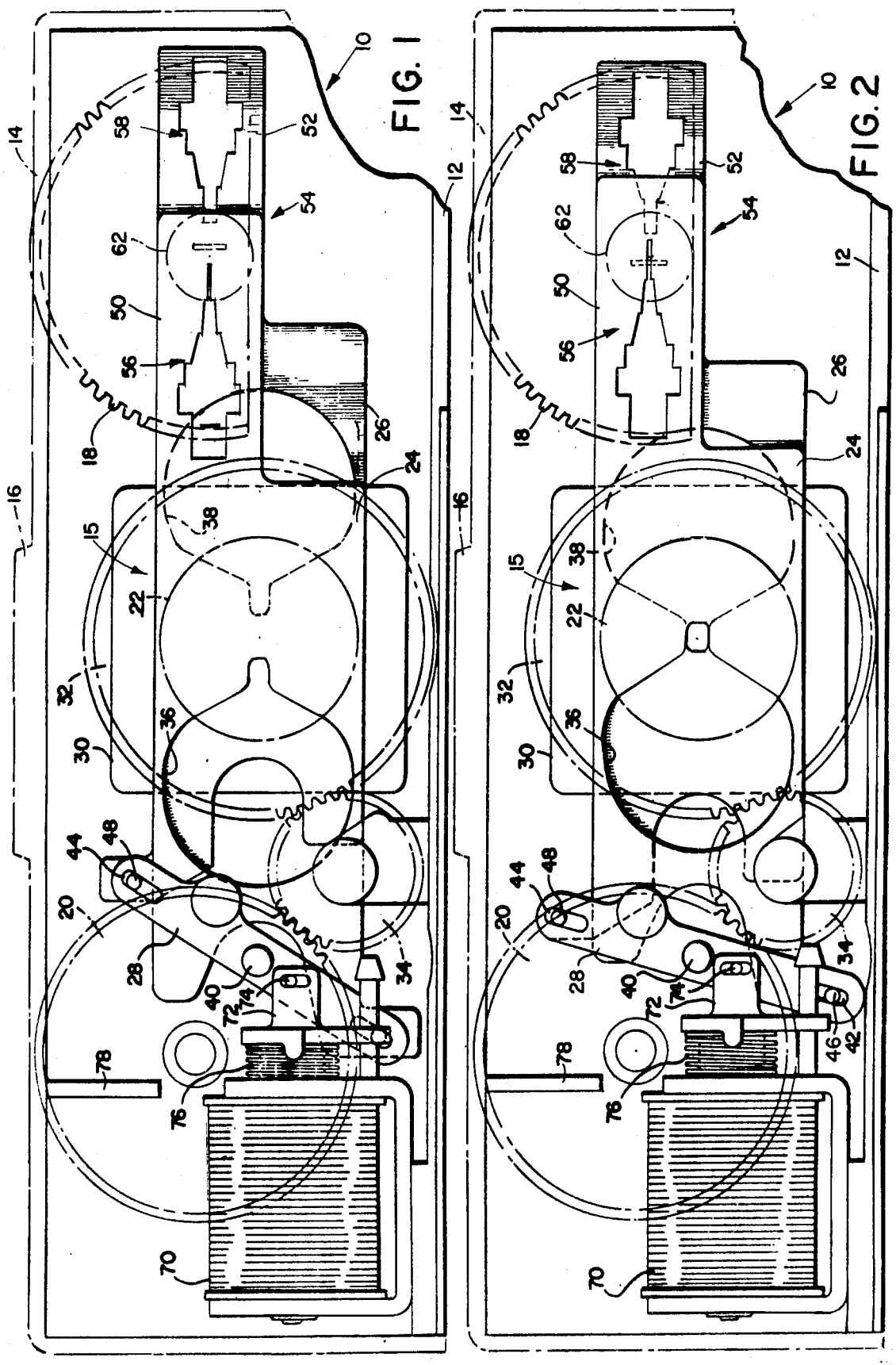

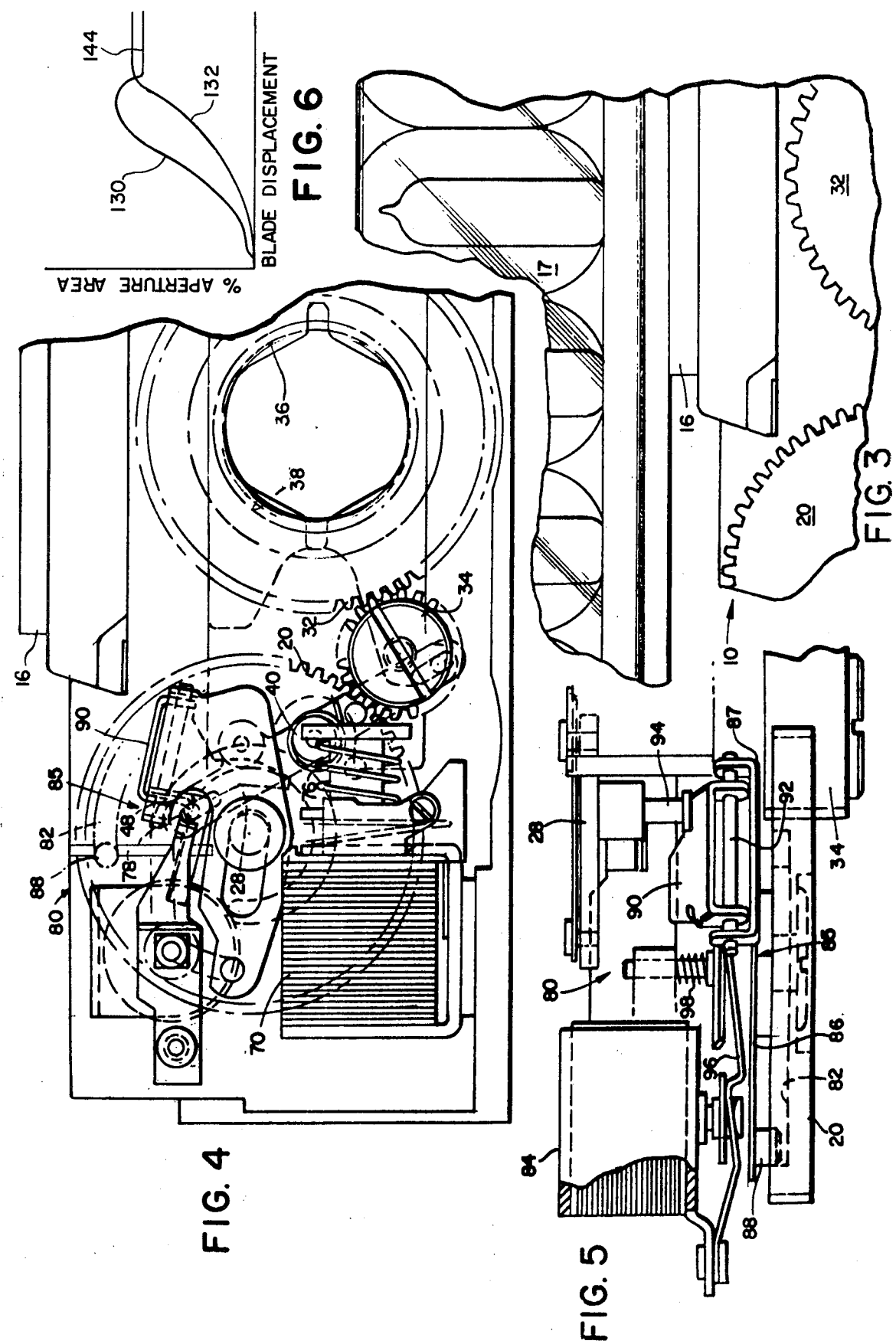

PHOTOGRAPHIC EXPOSURE APPARATUS FOR PROVIDING SMALL APERTURES

BACKGROUND OF THE INVENTION

This invention relates generally to photographic exposure control systems and, more particularly, to an exposure control system which is responsive to scene lighting in both ambient and flash modes of operation.

In U.S. Pat. No. 3,896,458, an automatic exposure control system responsive solely to scene light in ambient operation and additionally responsive to a subject distance in flash operation is described. In that arrangement, a shutter-diaphragm mechanism having a pair of reciprocally moving blade members simultaneously defines two correlated aperture values respectively controlling the scene light emitted to both the film plane and the camera photocell.

In the above-noted system, the shutter-diaphragm is driven from a closed position through enlarging aperture values with the photocell aperture, while small in comparison to the taking aperture, in a leading arrangement to the taking aperture so as to provide suitable anticipation of the final exposure value when the optical path is again blocked in accordance with a termination signal from the photocell network. In flash operation, the shutter-diaphragm is halted at predetermined positions in accordance with subject distance to select an operational aperture value for both the taking aperture and the photocell aperture. Compatible operation of the photoresponse is required for both modes of operation, but, additionally, because of the high light intensity reflected from the scene at near distances with flash exposure, it is important to provide very small photocell aperture values during initial stages of the blade opening. The latter requirement is complicated by factors inherent in forming small blade openings and in maintaining such openings in alignment during blade movement.

Consequently, it is an important object of this invention to provide a photographic exposure control system having improved photoresponsiveness.

It is another primary object of this invention to provide an improved automatic exposure control system suitable for both flash and ambient illumination at near subject distances.

Still another object of this invention is to provide a photographic diaphragm system having novel blade openings configured for providing relatively small, initial aperture values.

SUMMARY OF THE INVENTION

In accordance with the general concept of the invention, the exposure control system includes a diaphragm mechanism comprising a pair of reciprocally mounted blades which under actuation define changing values of both a taking aperture and a photocell aperture. The blades include a pair of secondary openings for defining photocell aperture values with one of the pair of secondary openings having a small leading edge portion followed by a portion of still further reduced size so that when the one secondary opening is initially brought into overlying relation with the leading edge of the other secondary opening, only the small leading edge portion of the one opening contributes to the photocell aperture value.

In the illustrated embodiment, the one opening is segmented and includes a first aperture of short length followed by an opaque blade portion and ultimately a second aperture forming the main body of the one opening.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic front elevational view of an exposure control system incorporating features of the instant invention, the view having portions broken away or removed to reveal internal structure;

FIG. 2 is a front elevational view of the exposure control system of FIG. 1 showing the components thereof in an orientation defining aperture openings;

FIG. 3 is a fragmentary view of the system of FIG. 1 in combination with a flash array;

FIG. 4 is a fragmentary view of the exposure control system of FIG. 1 showing the follow-focus mechanism of the invention;

FIG. 5 is a fragmentary view of the follow-focus mechanism illustrated in FIG. 4 with portions broken away to reveal internal features;

FIG. 6 is a graph depicting the aperture values of both the main aperture and the photocell aperture responsive to displacement of the shutter mechanism shown in FIG. 1;

DETAILED DESCRIPTION OF THE INVENTION

Figure 7:
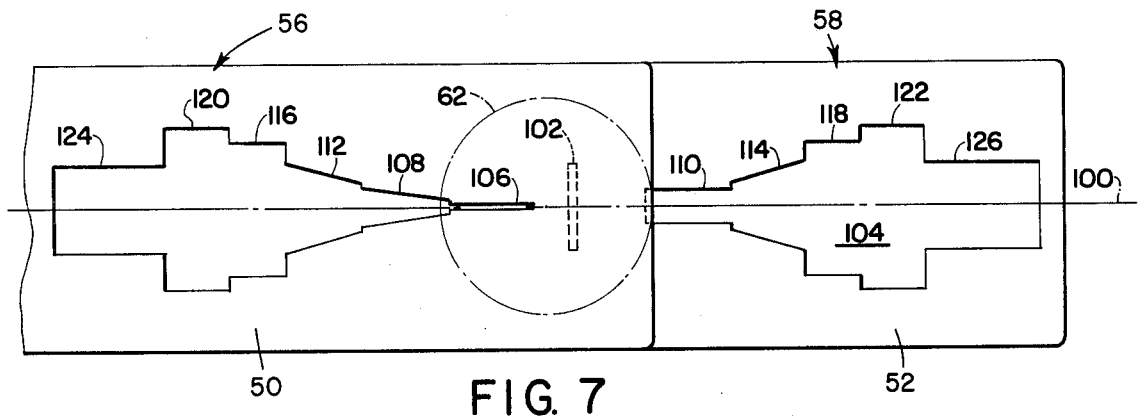
FIG. 7 is a plan view of photocell portion of the blade mechanism of FIG. 1 and illustrates the photocell aperture.

Referring now to FIG. 1, it can be seen that the exposure control system includes a housing 10 which comprises a rear casting 12 for supporting the components of the system. Surrounding the front and top of the casting 12 is a cover 14 which is structured as shown at 16 to support a packaged flashlamp array and related components, and which includes openings (not shown) through which protrude manually adjustable trim and focus wheels partially shown in dotted outline at 18 and 20, respectively. Centrally disposed within the back wall of the casting 12 is an exposure or light-entering opening 22 which defines the maximum available exposure aperture for the system.

Mounted on the casting 12 is a shutter-diaphragm mechanism 15 formed of a pair of elongated blades 24 and 26 which cooperate with an interconnecting actuator or walking beam 28. The blades 24 and 26 are slideably mounted on casting 12 by means of a bracket 30 which also serves to support a variable focus lens assembly illustrated at 32. Connection between the lens assembly 32 and the focus wheel 20 is provided by an idler gear shown at 34 such that rotation of the focus wheel 20 provides displacement of the lens assembly 32 normal to the mechanism 15 for focusing of image-carrying rays passing through the aperture opening 22 (when the blades 24 and 26 are in an open orientation as in FIG. 2) to a rearwardly positioned film plane (not shown) when the system of FIG. 1 is employed in conjunction with a suitable film exposure chamber.

A pair of primary openings 36 and 38 formed in the blades 24 and 26 provide variable aperture openings in accordance with longitudinal displacement of the blades with respect to each other responsive to movement of the walking beam 28. In this respect, it can be seen that the walking beam 28 is journaled for rotation around a stud 40 extending from the rear casting 12. Elongate slots 42 and 44 formed in the distal ends of the walking beam 28 provide coupling with pins 46 and 48 fixed to and extending respectively from blades 24 and 26. Thus interconnected, the blades 24 and 26 move simultaneously with each other to define a main aperture opening of progressively varying value over the light entrance opening 22.

The blades 24 and 26 include end portions shown respectively at 50 and 52 which extend through a light detecting station 54. These end portions 50 and 52 overlie a photocell 62 of a light integrating unit (not shown) such that the openings 56 and 58 define a secondary or photocell aperture of progressively varying value in accordance with movement of the blades 24 and 26 and in synchronism or tracking relation with particular aperture values provided by the openings 36 and 38. As later explained in detail with regard to FIG. 7, the openings 56 and 58 are specially constructed to provide very small apertures upon initial movement of the blades.

A tractive electromagnetic device in the form of a solenoid 70 is employed to displace the blades 24 and 26 with respect to each other and the casting 12. As illustrated in FIG. 1 of the drawings, the solenoid plunger 72 is affixed to the walking beam 28 by means of a pin or stud 74 such that displacement of the plunger 72 will rotate the walking beam 28 around its pivot pin 40 and appropriately displace the shutter blades 26 and 28.

A spring member 76 surrounds the solenoid plunger 72 and biases it in a direction tending to open the blades so that the exposure system is particularly useful in a reflex camera in which a normally open shutter condition facilitates viewing and focusing procedures. Consequently, in the present arrangement, the blades 24 and 26 are drawn to their closed position (as shown in FIG. 1) only while the solenoid 70 is energized; with subsequent de-energization of the solenoid 70 permitting the blades 24 and 26 to move toward their maximum aperture opening under the urging of the spring 76. This deriving arrangement for the exposure control mechanism is described in more detail in the U.S. Pat. No. 3,868,712 issued to Conrad H. Biber on Feb. 25, 1975. It should be understood, however, that the exposure control system of the invention is equally applicable to photographic systems where the blades are held in a normally closed position.

In operation of the system, blades 24 and 26 are displaced from their terminal blocking position shown in FIG. 1 to provide enlarging aperture values, for example, as shown in FIG. 2, by de-energizing the solenoid 70 which permits the spring 76 to drive plunger 72 outwardly of the solenoid and, in turn, rotate walking beam 28 in a counter-clockwise direction (as viewed in FIG. 1) to force the aperture forming openings 36 and 38 and 56 and 58 into increasing coincidence as shown in FIGS. 2 and 4. The exposure interval is then terminated by again energizing the solenoid 70 so as to retract the plunger 72 against the spring 76.

As explained in detail in the above-noted U.S. Pat. No. 3,896,458, for flash operations a follow-focus mechanism 80 (shown in detail in FIGS. 4 and 5) is employed in conjunction with the light detecting station 54. As shown in FIGS. 4 and 5, the focus wheel 20 carries on its underside a cam track 82 within which a cam follower 85 is located. The cam follower 85 extends from beneath the focus wheel 20 to a point where it may be utilized to engage and stop the travel of the walking beam 28 at selected points in the beam path. This follow-focus mechanism 80 is made effective, when a flash unit 17 is mounted on the mechanism 14 as shown in FIG. 3, by means of a solenoid designated at 84 which, in effect, provides mechanical coupling between the focusing wheel 20 and the walking beam 28.

Referring now to FIG. 5 wherein the follow-focus mechanism 80 is shown in elevation with the focusing wheel 20 placed at the bottom of the view, it can be seen that the cam follower comprises an arm member 86 which extends across the focus wheel 20 and carries at one end a stud 88 which is positioned within the cam track 82. Carried at the other end 87 of the arm 86 opposite from the stud 88 is an interceptor element 90 which is pivotally mounted to the arm 86 by a shaft 92 and is operable in accordance with energization of the follow-focus solenoid 84 to intercept a depending stud 94 of the walking beam 28. This interception is accomplished by means of an arm member 96 which couples the solenoid 84 to the interceptor member 90. A spring member 98 is employed to urge the solenoid arm 96 downwardly so as to hold the interceptor 90 in a normally inoperative position.

Upon insertion of a flash array 17 (shown in FIG. 3), the exposure control system is automatically programmed for flash mode operation and includes automatic energization of solenoid 84 and, hence, operation of the follow-focus mechanism 80, responsive to initiation of an exposure interval. That is, following closing of the blades 24 and 26 and just prior to exposure, the solenoid 84 is energized to draw the extended arm 96 in a direction away from the focus wheel 20 and thereby pivots the interceptor 90 into the path of the walking beam stud 94 which arrests movement of the beam at a given point and thereby selects the final aperture values to be employed during that flash exposure.

Prior to completing the description of the hybrid flash control, the ambient mode operation will be explained. In the operation of the exposure control system, the follow-focus mechanism is disabled during ambient mode operation and once the viewing mode has been completed and the exposure chamber (not shown) prepared for exposure, with the blades 24 and 26 in their closed position shown in FIG. 1, the exposure interval is initiated by de-energizing the solenoid 70 to thereby release the blades which subsequently determine progressively enlarging apertures over both the exposure opening 22 and the photocell 62. During this exposure interval, the photocell 62 receives increasing amounts of scene light due to its progressively enlarging aperture value until it receives a total amount of light equal to a previously programmed value which initiates termination of the exposure interval. This termination is brought about by a signal which again energizes solenoid 70 to reclose the blades 24 and 26.

In the ambient mode, since the interceptor 90 is not positioned for interception, both the size of the main aperture and the photocell aperture are progressively enlarged as depicted in FIG. 6. The secondary or photocell aperture values defined by openings 56 and 58 produce a curve as approximately depicted at 130 when the blades 24 and 26 are driven from a fully closed position shown in FIG. 1 to a full open position shown in FIG. 2. Likewise, the primary or main exposure aperture also follows a curve approximately as depicted at 132 during this blade movement.

It should be understood that generally the photocell aperture area or value is much smaller than the area of the corresponding taking aperture. However, in FIG. 8, the curves are normalized; a normalized photocell area being defined as one which provides a correct exposure interval for a scene brightness where a long exposure time is employed such that opening and closing times become negligible. The final photocell aperture value depicted in this figure at 144 represents this normalized area.

As can be seen, the photocell aperture leads the main aperture or, that is, opens at a faster rate relative to its full open position than does the main aperture. This leading initially occurs because the openings 56 and 58 of the blades are closer together and begin to overlap sooner than the main openings 36 and 38 when the blades are displaced relative to each other in an opening direction. This lead time is employed so that the light detecting station 54 can provide an adequate anticipation of, or brightness sample related to, the total amount of light passing through the main aperture by the time the blades are closed, and thus take into account solenoid reaction time and the blade closing time.

Turning now to the flash mode, it should be first noted that under flash conditions the exposure control system operates as a hybrid system which regulates the exposure with regard to both subject distance and scene lighting. That is, correlated taking an photocell aperture values are selected by the follow-focus mechanism while the exposure interval is determined by the light integrating arrangement.

As in the ambient mode, once the camera exposure chamber is prepared for an exposure cycle, the exposure control system is automatically triggered to operate through an exposure phase. For flash, however, the exposure phase additionally includes a first timing signal for energizing the follow-focus mechanism 80, and after a suitable delay to permit the blades 24 and 26 to reach their selected aperture, a second timing signal for firing a flash bulb. As in ambient, the light detecting station 54 is operative such that upon receiving a sufficient total amount of light, it energizes solenoid 70 to again close the blades 24 and 26.

The described exposure system is designed for use from near subject distances of 10 inches to infinity in ambient and to 20 feet in flash such that to accommodate the high intensity of the reflected flash light at near distances, the photocell aperture values initially formed during movement of the blade mechanism must be relatively small. This follows from the fact that the photocell aperture values must be correlated to the taking aperture, and the maximum photocell aperture value is limited by available photocell area and packaging considerations. These constraints result in very small photocell aperture values (i.e., ranging upward from 0.0017 square inch) being required for correlation to the small taking aperture values which are employed under high intensity ambient and at near focal distances in flash exposure.

These very small aperture values are achieved in the illustrated embodiment by uniquely formed photocell or secondary openings 56 and 58 which will now be described with regard to FIG. 7.

Each of the openings 56 and 58 comprise small leading portions as defined with respect to the opening movement of the blades along the longitudinal blade axis 100 in a direction which tends to displace the openings 56 and 58 toward each other into increasing coincidence. As can be seen from FIG. 7, opening 58 comprises a first aperture 102 formed as a narrow slit oriented with its longitudinal axis (not shown) inclined to, and preferably perpendicular to, the blade axis 100, followed by a relative large second aperture 104 which forms the main body of the opening 58.

Since the main body 104 of the opening 58 is similar to that of the opening 56, it will be described with the latter. Turning now to the opening 56, it can be seen that it comprises a leading section 106 formed as a narrow elongated slit having its longitudinal axis aligned with the blade axis 100. This leading section 106 cooperates with the upright slit 102 of opening 58 to form an initial photocell aperture value of relatively small size, as later explained with regard to FIG. 8.

Following each of these leading slits 102 and 104, the openings 56 and 58 respectively include wider portions 108 and 110 which then give way to still wider identical portions in each opening. Hence, proceeding further along both openings 56 and 58, from the sections 108 and 110, are tapered portions 112 and 114, step portions 116 and 118, the widest portions 120 and 122 and trailing portions 124 and 126 which are narrower than the step portions 116 and provide a slight reduction in photocell aperture value when the taking aperture passes through its maximum in ambient operation.

Exemplary dimension of pertinent parts of the openings 56 and 58 follow so as to aid in the description of the openings and to provide an appreciation of the relatively small initial aperture values achieved. Referring first to the opening 58, the slit 102 is preferably 0.080 inch high and 0.012 inch long as measured along the axis 100, the latter dimension being defined as the length since it lies along the blade axis 100. The section 110 trails the upright section 102 by 0.068 inch so as to be 0.080 inch behind the leading edge of the section 102 and is 0.033 inch wide and 0.080 inch long. The section 114 tapers from 0.054 inch wide to 0.082 inch, while step 118 is 0.120 inch wide and 0.045 inch long and the maximum step 122 is 0.160 inch wide and 0.065 inch long.

Turning now to the opening 56, the leading slit 106 is made 0.014 inch wide and 0.080 inch long, followed by the section 108 which diverges from 0.025 inch to 0.033 inch over a length of 0.080 inch. The remaining sections 112, 116, 120 and 124 are substantially identical to their counterparts 114, 118 and 122 respectively of the opening 58.

Figure 8:
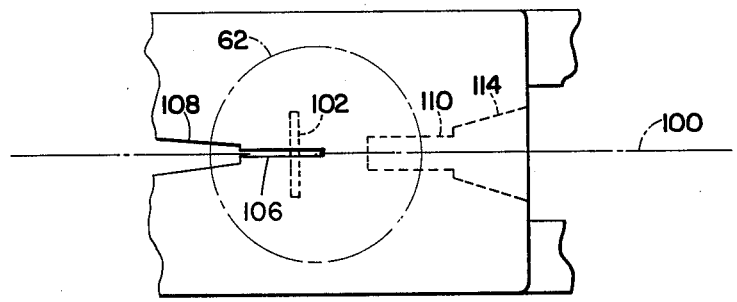
FIG. 8 is a plan view of the photocell openings of FIG. 7 as they form their initial aperture value.
Figure 9:
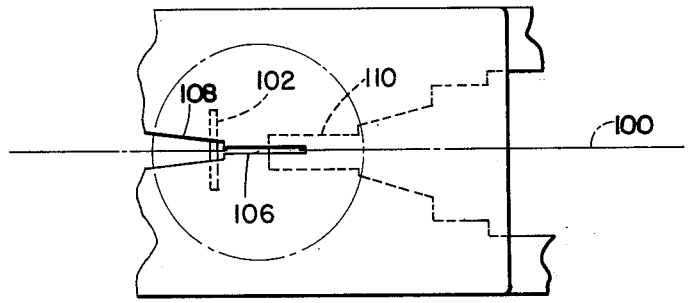
FIG. 9 is a plan view of the photocell openings of FIG. 7 as they are displaced from the position shown in FIG. 8 into slightly increased coincidence.

The operation of the openings 56 and 58 will now be explained. As the blades 24 and 26 are displaced from a blocking position shown in FIG. 1 in a direction to bring the main openings 36 and 38 into coincidence, the photocell openings 56 and 58 begin to overlap as the leading end of the section 106 passes into coincidence with the slit 102 and provides a very small aperture value (e.g., 0.0017 square inches) defined by the intersecting slits as shown in FIG. 8. This value of the photocell aperture then remains substantially constant with blade movement until the slit 106 reaches the section 110 and the slit 102 reaches the section 108 as shown in FIG. 9. As the latter occurs, the small initial aperture value begins to gradually increase.

In the illustrated embodiment, the length of the slit 106 is equal to the distance the body 104 of the opening 58 trails the leading edge of the slit 102 so that the section 108 starts to coincide with the slit 102 as the latter starts to coincide with the main body 104 and specifically with the section 110 thereof. However, it is important to note that by varying the length of the slit 106 or the spacing between the slit 102 and its main body 104, the further enlargement in aperture value can be advantageously controlled.

Preferably both slits 102 and 106 are as narrow as practical so as to permit economical forming and, hence, have approximately the same transverse dimension which essentially determines the minimum photocell aperture value since one slit is perpendicular to the other. Additionally, the upright slit 102 should be separated from the next larger section (section 110) of its opening by a spacing which preferably is several times larger than the dimension of the upright section as measured along the blade axis 100 so that the small value formed by the crossed slit is retained during some further movement of the blades. That is, once the leading sections fully intersect, slight further movement only changes the aperture value in accordance with any change in the width of the longitudinal slit 106 since its tip is then in coincidence with the opaque blade portion lying between slit 102 and the body portion 104 and, hence, does not add to the aperture value as in the conventional aperture arrangement. Stated otherwise, during slight further movement of the blades, the tip of the slit 106 passes out of coincidence with any portion of the other opening and only a previously unused portion of the slit 106 is in coincidence with the slit 102.

Figure 10:
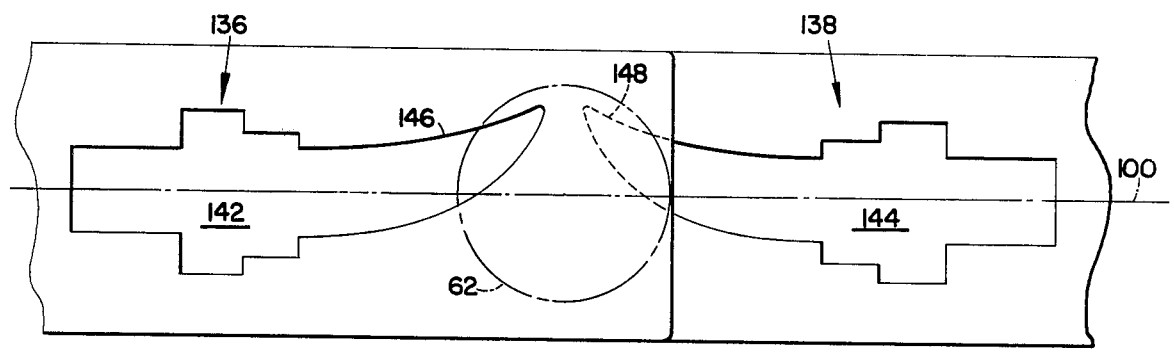
FIG. 10 is a plan view of an alternate embodiment of the blade openings designed to provide a small photocell aperture value.

In an alternate embodiment, very small aperture values are achieved by uniquely formed photocell or secondary openings 56 and 58 which will now be described with regard to FIG. 10.

In this arrangement, each of the photocell openings designated 136 and 138 comprise main body sections 142 and 144 (which are symmetrical about the blade path or axis 100 which passes through the center of the photocell 62) and pointed leading portions 146 and 148, respectively, which extend toward each other at an oblique angle to the blade axis.

Figure 11:
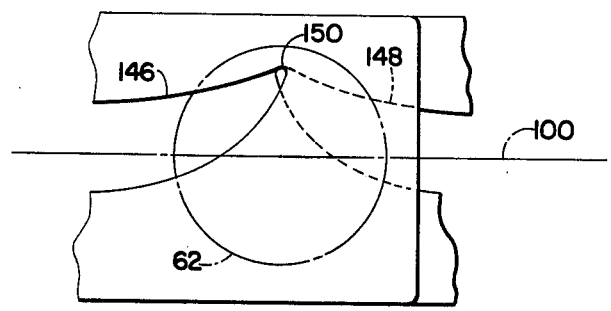
FIG. 11 is a plan view of the blade openings of FIG. 9 illustrating their initial overlap responsive to blade movement.
Figure 12:
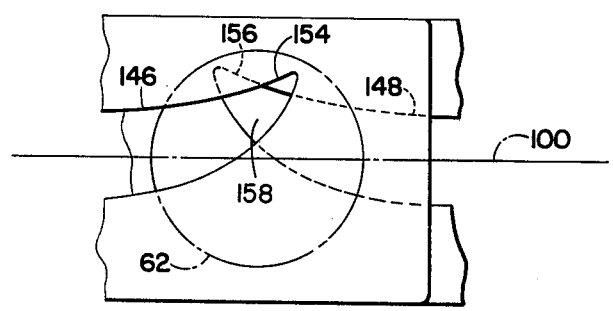
FIG. 12 is a plan view of the blade openings shown in FIG. 9 illustrating increased overlap of the blade openings.

The leading portions 146 and 148 are each brought to a point so that a very small aperture value is formed as these points intersect as shown at 150 in FIG. 11 during initial blade movement toward each other. Then as blade movement continues, ever widening portions of the leading members 146 and 148 come into coincidence to provide a smoothly increasing aperture value whose precise value is at any given time essentially defined primarily by the transverse dimension of the leading section as measured parallel to the axis 100. This follows from the fact that, similar to the preferred embodiment, once the leading sections intersect, slight further movement brings previously unused portions of the leading sections into coincidence (as shown in FIG. 12) while preceding leading sections designated at 154 and 156 pass over each other and hence do not contribute to the aperture value designated at 158.

Hence, the use of tapered, diverging leading portions located at an oblique angle to the blade path provide a very controlled aperture change which ranges between a relatively small photocell value to a relatively large value.

It should be understood that this invention may be practiced or embodied in still other ways without departing from the spirit or essential character thereof. Hence, the illustrated embodiment herein is illustrative and not restrictive, the scope of the invention being indicated by the appended claims and all variations which come within the meaning of the claims are intended to be embraced therein.

What is claimed is:

1. In a photographic exposure control system for defining an aperture value in operative relation to a given optical path, a blade mechanism comprising a pair of blade members having a given blade axis, each of said blade members having an open portion therein with at least a main section thereof lying on the axis of its respective blade member, said main sections exceeding at some point a given width as measured transverse to the blade axis, means for mounting said blade members for displacement across said given optical path along a blade path in which said blade axes are maintained in a substantially parallel relation to provide at least partial coincidence of said openings at said given optical path thereby defining an operative aperture value thereat in accordance with the extent of said coincidence, the improvement comprising:

each of said open portions having a relatively narrow, elongated portion extending from the leading end of its respective open portion toward the other opening as viewed with respect to blade displacement, at least one of said elongated portions extending at an angle to the given axis of its respective blade member such that during initial displacement of said blade members, the elongated portion of one blade member passes across the elongated portion of the other blade member and then out of coincidence therewith at said optical path to define a relatively small initial aperture value thereat as compared to the relatively large aperture value when the main sections of each open portion are brought into increasing coincidence.

2. The improvement of claim 1 wherein said one elongated portion is substantially perpendicular to the given axis of its respective blade member.

3. The improvement of claim 2 wherein the other elongated portion extends along the given axis of its respective blade member.

4. The improvement of claim 1 wherein both of said elongated portions extend at an oblique angle to the given axis of their respective blade members.

5. The improvement of claim 4 wherein said elongated portions are tapered from the leading end of their respective main sections to provide an increasing initial value as said elongated portions are displaced across each other.

6. The improvement of claim 4 wherein each of said elongated portions extend in a curved arrangement from their respective main sections.

7. The improvement of claim 4 wherein each of said elongated portions extend from the main sections of their respective open portions at a point where the blade axis passes through the leading end of the main sections.

8. In a photographic exposure control system for defining an aperture value in operative relation to a given optical path, a blade mechanism comprising a pair of blade members having a given blade axis, each of said blade members having an open portion therein with at least a main section thereof lying on the blade axis, the main section of each open portion exceeding at some point a given width as measured transverse to the blade axis, means for mounting said blade members for displacement across said given optical path along a blade path in which said blade axes are maintained in a substantially parallel relation to provide at least partial coincidence of said open portions at said given optical path thereby defining an operative aperture value thereat in accordance with the extent of said coincidence, the improvement comprising:

the open section of one of said blade members having a relatively narrow, elongated first slit extending in leading relation, as viewed with respect to blade displacement, from the main section thereof; and the open portion of the other of said blade members being formed by a pair of openings comprising a relatively narrow, elongated second slit spaced in leading relation from another opening which defines the main section of the open portion and at an angle to the axis of its blade member such that during initial displacement of said blade members, the leading end of said first slit passes across said second slit and then out of coincidence therewith at said optical path to define, in accordance with the intersecting portions of said slits, a relatively small initial aperture value as compared to the relatively large aperture value when the main sections of each open portion are brought into increasing coincidence.

9. The improvement of claim 8 wherein said second slit is located with its longitudinal axis substantially perpendicular to the given axis of its respective blade member.

10. The improvement of claim 8 wherein said first slit is located with its longitudinal axis lying on the given axis of said one blade member.

11. The improvement of claim 8 wherein the length of said first and second slits is several times larger than their narrow width.

12. The improvement of claim 8 wherein the length of said first slit is sufficiently larger than the narrow width of said second slit to permit displacement of the leading end of said first slit into and out of coincidence with said second slit prior to any portion of the remainder of the open portion in said one blade member passing into coincidence with said second slit.

13. The improvement of claim 12 wherein said second slit is located on said other blade member with its longitudinal axis approximately perpendicular to the given axis of said other blade member.

14. The improvement of claim 12 wherein at least a portion of each of said slits intersect the given axis of their respective blade member.

15. The improvement of claim 2 wherein one of said slits has a narrow width of approximately 0.012 inches and the other of said slits has a narrow width of approximately 0.014 inches.

16. The improvement of claim 12 wherein said second slit is spaced from said leading edge of said other opening a distance greater than the width of said second slit.

17. A photographic exposure control system for exposing, under ambient or flash illumination, photographic material located at a given film plane, said system comprising a housing having an opening therein, a lens system for directing image-carrying rays along a given exposure path from a scene through said housing opening and for focusing such rays on such photographic material, means for sensing the brightness of said scene, means for unblocking and blocking said exposure path and said sensing means, means for actuating said unblocking and blocking means to unblock said exposure path and thereby initiate an exposure cycle, means responsive to said sensing means for actuating said unblocking and blocking means to block said path following the unblocking thereof so as to terminate said cycle, said unblocking and blocking means including a pair of blade members mounted for displacement with respect to each other in overlying relation along the same blade path, each of said blade members having a primary and a secondary open portion which when displaced into at least partial coincidence with the corresponding open portion of the other blade member respectively define a primary aperture value over said exposure path and a secondary aperture value over said brightness sensing means, each of said secondary open portions having a main section exceeding at some point a given width as measured transverse to said blade path and an elongated slit of narrow width as compared to said given width, the elongated slit of each blade member being located in leading relation, as viewed with respect to blade displacement, to the main section of its respective open portion, at least one of said slits extending at an angle to said blade path and to the other slit so that during initial displacement, the leading end of at least one of said slits passes across the other slit and then out of coincidence therewith over said sensing means to define, in accordance with the intersecting portions of said slits, a relatively small initial aperture value thereat as compared to the relatively large aperture value when the main sections of each open portion are brought into increasing coincidence.

18. The system of claim 17 wherein one of said slits extends generally parallel to said blade path and the other of said slits is at an angle to said blade path.

19. The system of claim 18 wherein said other slit is located with its longitudinal axis substantially perpendicular to said blade axis.

* * * * *